(12) United States Patent
Kim et al.

(10) Patent No.: US 10,865,289 B2
(45) Date of Patent: Dec. 15, 2020

(54) PLASTICIZER COMPOSITION, RESIN COMPOSITION AND METHODS OF PREPARING THE SAME

(71) Applicant: LG CHEM, LTD., Seoul (KR)

(72) Inventors: Hyun Kyu Kim, Daejeon (KR); Mi Yeon Lee, Daejeon (KR); Yun Ki Cho, Daejeon (KR); Jeong Ju Moon, Daejeon (KR); Joo Ho Kim, Daejeon (KR); Seok Ho Jeong, Daejeon (KR)

(73) Assignee: LG CHEM, LTD., Seoul (KR)

(*) Notice: Subject to any disclaimer, the term of this patent is extended or adjusted under 35 U.S.C. 154(b) by 70 days.

(21) Appl. No.: 15/767,619

(22) PCT Filed: Jun. 13, 2017

(86) PCT No.: PCT/KR2017/006146
§ 371 (c)(1),
(2) Date: Apr. 11, 2018

(87) PCT Pub. No.: WO2017/222232
PCT Pub. Date: Dec. 28, 2017

(65) Prior Publication Data
US 2018/0298161 A1 Oct. 18, 2018

(30) Foreign Application Priority Data
Jun. 20, 2016 (KR) .................. 10-2016-0076704

(51) Int. Cl.
| | | |
|---|---|---|
| *C08K 5/12* | (2006.01) | |
| *C08G 63/181* | (2006.01) | |
| *C08G 63/199* | (2006.01) | |
| *C08K 5/00* | (2006.01) | |
| *C08G 63/18* | (2006.01) | |
| *C08K 5/103* | (2006.01) | |
| *C08K 5/101* | (2006.01) | |
| *C08L 23/06* | (2006.01) | |
| *C08L 23/08* | (2006.01) | |
| *C08L 23/12* | (2006.01) | |
| *C08L 25/06* | (2006.01) | |
| *C08L 27/06* | (2006.01) | |
| *C08L 61/02* | (2006.01) | |
| *C08L 75/04* | (2006.01) | |

(52) U.S. Cl.
CPC ............. *C08K 5/12* (2013.01); *C08G 63/18* (2013.01); *C08G 63/181* (2013.01); *C08G 63/199* (2013.01); *C08K 5/00* (2013.01); *C08K 5/101* (2013.01); *C08K 5/103* (2013.01); *C08L 23/06* (2013.01); *C08L 23/0853* (2013.01); *C08L 23/12* (2013.01); *C08L 25/06* (2013.01); *C08L 27/06* (2013.01); *C08L 61/02* (2013.01); *C08L 75/04* (2013.01); *C08L 2207/04* (2013.01)

(58) Field of Classification Search
None
See application file for complete search history.

(56) References Cited

U.S. PATENT DOCUMENTS

| | | |
|---|---|---|
| 7,297,738 B2 | 11/2007 | Gosse et al. |
| 7,413,813 B2 | 8/2008 | Gosse et al. |
| 7,585,571 B2 | 9/2009 | Gosse et al. |
| 7,855,340 B2 | 12/2010 | Gosse et al. |
| 8,084,534 B2 | 12/2011 | Gosse et al. |
| 8,283,411 B2 | 10/2012 | Gosse et al. |
| 8,653,184 B2 | 2/2014 | Gosse et al. |
| 8,669,311 B2 | 3/2014 | Colle et al. |
| 9,340,658 B2 | 5/2016 | Boppana et al. |
| 2005/0020718 A1 | 1/2005 | Gosse et al. |
| 2005/0049341 A1 | 3/2005 | Grass et al. |
| 2007/0293646 A1 | 12/2007 | Gosse et al. |
| 2008/0274364 A1 | 11/2008 | Gosse et al. |
| 2009/0291304 A1 | 11/2009 | Gosse et al. |
| 2010/0298477 A1 | 11/2010 | Godwin |
| 2010/0305250 A1 | 12/2010 | Colle et al. |
| 2010/0310891 A1 | 12/2010 | Godwin |
| 2011/0040001 A1 | 2/2011 | Gosse et al. |
| 2011/0206907 A1 | 8/2011 | Hurley et al. |
| 2012/0071598 A1 | 3/2012 | Gosse et al. |
| 2013/0225737 A1 | 8/2013 | Gosse et al. |
| 2013/0274395 A1 | 10/2013 | Arendt et al. |
| 2013/0274396 A1 | 10/2013 | Arendt et al. |
| 2014/0082885 A1 | 3/2014 | Tsujio |
| 2015/0210827 A1 | 7/2015 | Yontz et al. |
| 2016/0053085 A1 | 2/2016 | Arendt et al. |
| 2016/0326346 A1* | 11/2016 | Gourdin .................. C08K 5/11 |
| 2017/0101520 A1 | 4/2017 | Yontz et al. |

FOREIGN PATENT DOCUMENTS

| | | |
|---|---|---|
| CN | 101990560 A | 3/2011 |
| CN | 101993548 A | 3/2011 |
| CN | 103772848 A | 5/2014 |
| EP | 2810982 A1 | 12/2014 |
| KR | 10-1084958 | 11/2011 |
| WO | 2012/092366 A1 | 7/2012 |
| WO | 2014/195055 A1 | 12/2014 |

* cited by examiner

Primary Examiner — Robert T Butcher
(74) Attorney, Agent, or Firm — Dentons US LLP

(57) ABSTRACT

The present invention relates to a plasticizer composition, a resin composition and methods of preparing the same, and provides a plasticizer which is environmentally friendly so as to be suitable for use, exhibits excellent transparency and adhesiveness, and can be improved in basic properties such as tensile strength, an elongation rate, hardness and the like when used as a plasticizer for a resin composition, and a resin composition including the same.

2 Claims, No Drawings

PLASTICIZER COMPOSITION, RESIN COMPOSITION AND METHODS OF PREPARING THE SAME

TECHNICAL FIELD

Cross-Reference to Related Application

This application is a National Stage Application of International Application No. PCT/KR2017/006146 filed Jun. 13, 2017, and claims the benefit of Korean Patent Application No. 10-2016-0076704, filed on Jun. 20, 2016, all of which are incorporated by reference in their entirety for all purposes as if fully set forth herein.

TECHNICAL FIELD

The present invention relates to a plasticizer composition, a resin composition and methods of preparing the same.

BACKGROUND ART

Conventionally, a plasticizer forms an ester through a reaction between an alcohol and a polycarboxylic acid such as phthalic acid or adipic acid. In addition, in consideration of domestic and international regulations for phthalate-based plasticizers harmful to humans, there is ongoing research on plasticizer compositions that can replace phthalate-based plasticizers such as terephthalate-, trimellitate-, other polymer-based plasticizers and the like.

Meanwhile, there is an increasing demand for environment-friendly products obtained in the plastisol industry relating to flooring materials, wallpaper, soft and hard sheets and the like, the calendering industry, the extruding/injecting compound industry, and in order to reinforce a quality feature, processability and productivity of each end product for such environment-friendly products, suitable plasticizers have to be used depending on discoloration, migration, mechanical properties and the like.

Depending on properties required by industry in a variety of areas of use, such as tensile strength, an elongation rate, light fastness, migration, gelability or an absorption rate, a PVC resin is mixed with a supplementary material such as a plasticizer, a filler, a stabilizer, a viscosity depressant, a dispersant, an antifoaming agent or a foaming agent.

As an example, among plasticizer compositions applicable to PVC, when di(2-ethylhexyl)terephthalate, which is relatively cheap and most widely used, is applied, a plasticizer exhibits high hardness or sol viscosity, a relatively low absorption rate, and poor migration and stress migration.

To improve the physical properties, a hydrogenated material of di(2-ethylhexyl)terephthalate may be considered. However, while the hydrogenated material can improve plasticization efficiency, poor migration or thermal stability is exhibited, and an increase in production cost caused by hydrogenation is accompanied, thereby it is difficult to ensure economic feasibility.

To overcome such a problem, there is a consistent demand for developing a new composition product including a mixed composition which has properties superior to those of the hydrogenated di(2-ethylhexyl)terephthalate, such as di(2-ethylhexyl) 1,4-cyclohexanoate, or a new derivative thereof, and research on developing products and their uses as environment-friendly plasticizers for vinyl chloride-based resins is progressing.

DISCLOSURE

Technical Problem

Therefore, during research on plasticizers, the inventors developed a plasticizer composition, which can improve inferior properties caused by structural restraints, is environmentally friendly, and can be improved in properties such as plasticization efficiency, an absorption rate, migration, volatile loss and the like when used in combination with a resin composition, and thus completed the invention.

That is, the present invention is directed to providing a plasticizer which can be improved in properties such as an absorption rate, plasticization efficiency, migration, tensile strength, an elongation rate, volatile loss and the like when used as a plasticizer for a resin composition, a method of preparing the same and a resin composition including the same.

Technical Solution

In one aspect, the present invention provides a plasticizer composition which includes a cyclohexane 1,4-diester-based material represented by the following Chemical Formula 1; and a dibenzoate-based material including one or more compounds represented by the following Chemical Formula 2, wherein the cyclohexane 1,4-diester-based material is included at greater than 30 wt % and equal to or less than 99 wt %, and the dibenzoate-based material is included at equal to or higher than 1 wt % and less than 70 wt %.

[Chemical Formula 1]

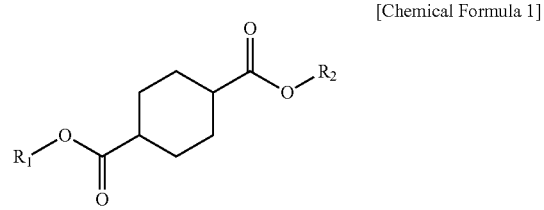

In Chemical Formula 1, $R_1$ and $R_2$ each independently are the same or different from each other and are alkyl groups having 1 to 12 carbon atoms.

[Chemical Formula 2]

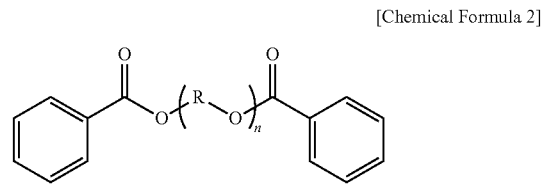

In Chemical Formula 2, R is an alkylene group having 2 to 4 carbon atoms, and n is an integer ranging from 1 to 3.

The compound represented by Chemical Formula 2 may be one or more selected from the group consisting of diethylene glycol dibenzoate (DEGDB), dipropylene glycol dibenzoate (DPGDB) and triethylene glycol dibenzoate (TEGDB).

In another aspect, the present invention provides a method of preparing a plasticizer composition, which includes preparing a cyclohexane 1,4-diester-based material by hydrogenating a terephthalate-based material in the presence of a metal catalyst; and obtaining a plasticizer composition by blending the cyclohexane 1,4-diester-based material and a dibenzoate-based material in such a way that a content of the cyclohexane 1,4-diester-based material is greater than 30 wt % and equal to or less than 99 wt % and a content of the dibenzoate-based material is equal to or higher than 1 wt % and less than 70 wt %, wherein the terephthalate-based material is a single compound or a mixture.

When the terephthalate-based material is a single compound, the cyclohexane 1,4-diester-based material may also be a single compound, and the terephthalate-based material may be prepared through direct esterification of one or more alcohols selected from the group consisting of 2-ethylhexyl alcohol, isononyl alcohol and butyl alcohol, and terephthalic acid.

When the terephthalate-based material is a mixture, the cyclohexane 1,4-diester-based material may also be a mixture, and the terephthalate-based material may be prepared through direct esterification of two or more alcohols selected from the group consisting of 2-ethylhexyl alcohol, isononyl alcohol and butyl alcohol, and terephthalic acid.

When the terephthalate-based material is a mixture, the cyclohexane 1,4-diester-based material may also be a mixture, and the terephthalate-based material may be prepared through trans-esterification of di(2-ethylhexyl)terephthalate and butyl alcohol; trans-esterification of diisononyl terephthalate and butyl alcohol; or trans-esterification of di(2-ethylhexyl)terephthalate and diisononyl alcohol.

In still another aspect, the present invention provides a resin composition which includes 5 to 150 parts by weight of the plasticizer composition with respect to 100 parts by weight of one or more resins selected from the group consisting of ethylene vinyl acetate, polyethylene, polypropylene, polyketone, polyvinyl chloride, polystyrene, polyurethane and a thermoplastic elastomer.

The resin composition may be applied in preparation of one or more selected from the group consisting of electric wires, flooring materials, interior materials for automobiles, films, sheets, wallpaper and tubes.

Advantageous Effects

The plasticizer composition according to an embodiment of the present invention can ensure an environmentally-friendly property and can be improved in properties such as an absorption rate, plasticization efficiency, migration, volatile loss and the like when used for a resin composition.

MODES OF THE INVENTION

Hereinafter, the present invention will be described in more detail for promoting understanding of the present invention.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

The term "butyl" used herein refers to an alkyl group having 4 carbon atoms, and includes both linear and branched. For example, the butyl may be n-butyl, isobutyl, or t-butyl, and preferably, n-butyl or isobutyl.

The term "octyl" and "2-ethylhexyl" used herein refer to alkyl groups having 8 carbon atoms, and octyl may be used interchangeably with 2-ethylhexyl as an abbreviation of 2-ethylhexyl. Therefore, in some cases, this term may mean octyl, which is a linear alkyl group, but may also mean 2-ethylhexyl, which is a branched alkyl group.

The cyclohexane 1,4-diester-based material may be represented by the following Chemical Formula 1.

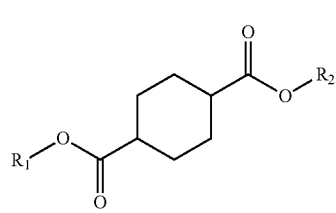

[Chemical Formula 1]

In Chemical Formula 1, $R_1$ and $R_2$ may be the same or different from each other, and each of $R_1$ and $R_2$ may be selected from alkyl groups having 1 to 12 carbon atoms.

In the specification, the cyclohexane 1,4-diester-based material may be named dialkyl cyclohexane-1,4-diester, for example, when $R_1$ and $R_2$ are the same as each other, and may be named alkyl($R_1$)alkyl($R_2$) cyclohexane-1,4-diester when $R_1$ and $R_2$ are different from each other.

$R_1$ and $R_2$ each independently may be the same or different from each other, and may be an alkyl group having 4 to 10 carbon atoms. Preferably, $R_1$ and $R_2$ each independently may be selected from the group consisting of a butyl group, an isobutyl group, an amyl group, a hexyl group, a heptyl group, an isoheptyl group, a 2-ethylhexyl group, an octyl group, an isononyl group, a nonyl group, a 2-propylheptyl group, an isodecyl group and a decyl group.

Specifically, the cyclohexane 1,4-diester-based materials may be a single compound or a mixture of two or more selected from the group consisting of butyl(2-ethylhexyl) cyclohexane-1,4-diester (1,4-BEHCH), (2-ethylhexyl) isononyl cyclohexane-1,4-diester (1,4-EHINCH), butyl isononyl cyclohexane-1,4-diester (1,4-BINCH), dibutyl cyclohexane-1,4-diester (1,4-DBCH), diisononyl cyclohexane-1,4-diester (1,4-DINCH) and di(2-ethylhexyl) cyclohexane-1,4-diester (1,4-DEHCH).

More specifically, when the cyclohexane 1,4-diester-based material is a single compound, the cyclohexane 1,4-diester-based material is preferably bis(2-ethylhexyl) cyclohexane-1,4-diester or diisononyl cyclohexane-1,4-diester. In addition, when the cyclohexane 1,4-diester-based material is a mixture, the cyclohexane 1,4-diester-based material may be a mixture of three types of cyclohexane 1,4-diester-based materials, and may be, for example, a first mixture of bis(2-ethylhexyl) cyclohexane-1,4-diester, butyl (2-ethylhexyl) cyclohexane-1,4-diester and dibutyl cyclohexane-1,4-diester, a second mixture of diisononyl cyclohexane-1,4-diester, butyl isononyl cyclohexane-1,4-diester and dibutyl cyclohexane-1,4-diester, or a third mixture of bis(2-ethylhexyl) cyclohexane-1,4-diester, (2-ethylhexyl) isononyl cyclohexane-1,4-diester and diisononyl cyclohexane-1,4-diester.

Specifically, the first to third mixtures may have specific composition ratios, and the first mixture may include 3.0 to 99.0 mol % of bis(2-ethylhexyl) cyclohexane-1,4-diester, 0.5 to 96.5 mol % of butyl (2-ethylhexyl) cyclohexane-1,4-diester and 0.5 to 96.5 mol % of dibutyl cyclohexane-1,4-diester, the second mixture may include 3.0 to 99.0 mol % of diisononyl cyclohexane-1,4-diester, 0.5 to 96.5 mol % of butyl isononyl cyclohexane-1,4-diester and 0.5 to 96.5 mol % of dibutyl cyclohexane-1,4-diester, and the third mixture may include 3.0 to 99.0 mol % of bis(2-ethylhexyl) cyclohexane-1,4-diester, 0.5 to 96.5 mol % of (2-ethylhexyl) isononyl cyclohexane-1,4-diester and 0.5 to 96.5 mol % of diisononyl cyclohexane-1,4-diester.

The composition ratio may be the ratio of a mixed composition generated by esterification, and a composition ratio designed by further mixing a specific compound. The mixed composition ratio may be suitably controlled for desired physical properties.

In addition, according to an embodiment of the present invention, there is provided a plasticizer composition which further includes a dibenzoate-based material including one or more dibenzoate-based compounds in addition to the cyclohexane 1,4-diester-based material. The dibenzoate-based compound may be represented by the following Chemical Formula 2.

[Chemical Formula 2]

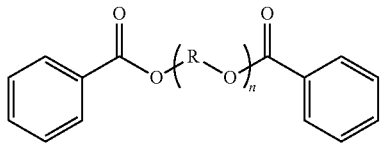

In Chemical Formula 2, R is an alkylene group having 2 to 4 carbon atoms, and n is an integer ranging from 1 to 3.

Specifically, the dibenzoate-based compound represented by Chemical Formula 1 may be a compound in which an alkylene group and a dibenzoate group are sequentially bound to either side of an ester group which is present in the center. When n is 2 or more, the alkylene groups represented by R may have the same or different number of carbon atoms. Preferably, the same alkylene groups are bound, they have 2 to 4 carbon atoms, and alkyl groups having 1 to 3 carbon atoms may be bound as a branch. When the branches are bound, the carbon number of the branch is preferably smaller than that of the main chain binding to the dibenzoate group.

Here, when n is 2 or more and the alkylene groups represented by R are the same, the compound of the present invention may be called a non-hybrid dibenzoate-based compound, whereas when n is 2 or more and the alkylene groups represented by R are different, the compound of the present invention may be called a hybrid dibenzoate-based compound. However, when used as a plasticizer composition, the non-hybrid dibenzoate-based compound may be more common than the hybrid dibenzoate-based compound. If there is no mention of hybrid or non-hybrid in the specification, every R may be treated as the same non-hybrid dibenzoate-based compound.

In Chemical Formula 1, R is preferably any one selected from the group consisting of ethylene, propylene, isopropylene, butylene and isobutylene, but the present invention is not limited thereto. More preferably, the dibenzoate-based compound represented by Chemical Formula 1 is diethylene glycol dibenzoate, dipropylene glycol dibenzoate or triethylene glycol dibenzoate.

A dibenzoate-based material including one or more such dibenzoate-based compounds may be the diethylene glycol dibenzoate, diisopropylene glycol dibenzoate, triethylene glycol dibenzoate or a mixture thereof, or may be a mixture further including the dibenzoate-based compound matching the definition of R.

According to an embodiment of the present invention, a cyclohexane 1,4-diester-based material may be included at greater than 30 wt % in the plasticizer composition, and the upper limit may be 99 wt % or less. Also, a dibenzoate-based material may be included at less than 70 wt %, and the lower limit may be 1 wt % or more.

Preferably, the upper limit of the weight ratio of two materials is 99:1, 95:5 or 90:10, and the lower limit thereof is 40:60, 45:65 or 50:50. More preferably, the range of the weight ratio is 95:5 to 60:40, and most preferably 95:5 to 70:30.

As described in the present invention, when the cyclohexane 1,4-diester-based material and the dibenzoate-based material are mixed and then applied to a plasticizer composition, the composition may ensure an environmentally-friendly property and may be improved in properties such as an absorption rate, plasticization efficiency, migration, volatile loss and the like.

According to an embodiment of the present invention, there is provided a method of preparing a plasticizer composition, which includes preparing a cyclohexane 1,4-diester-based material by hydrogenating a terephthalate-based material in the presence of a metal catalyst; and obtaining a plasticizer composition by blending the cyclohexane 1,4-diester-based material and a dibenzoate-based material in such a way that a weight ratio of the cyclohexane 1,4-diester-based material and a dibenzoate-based material is in the above-described range.

The terephthalate-based material may be a single compound or a mixture.

When the terephthalate-based material is a single compound, the terephthalate-based material may be prepared by direct esterification between one or more alcohols selected from the group consisting of 2-ethylhexyl alcohol, isononyl alcohol, butyl alcohol and isobutyl alcohol, and terephthalic acid.

The direct esterification may be performed by adding terephthalic acid to an alcohol and then reacting the resulting mixture in the presence of a catalyst under a nitrogen atmosphere; removing an unreacted alcohol and neutralizing an unreacted acid; and performing dehydration and filtration through vacuum distillation.

The alcohol may be used in the range of 150 to 500 mol %, 200 to 400 mol %, 200 to 350 mol %, 250 to 400 mol %, or 270 to 330 mol % on the basis of 100 mol % of terephthalic acid.

The catalyst may include, for example, one or more selected from acidic catalysts such as sulfuric acid, hydrochloric acid, phosphoric acid, nitric acid, para-toluenesulfonic acid, methanesulfonic acid, ethanesulfonic acid, propanesulfonic acid, butanesulfonic acid, an alkyl sulfate and the like, metal salts such as aluminum sulfate, lithium fluoride, potassium chloride, cesium chloride, calcium chloride, iron chloride, aluminum phosphate and the like, metal oxides such as a heteropoly acid and the like, natural/synthetic zeolites, cation and anion exchange resins, and organic metals such as a tetra alkyl titanate and polymers thereof and the like. As a specific example, the catalyst may be a tetra alkyl titanate.

An amount of the catalyst used may be varied depending on its type. For example, the amount of a homogeneous catalyst may be in the range of 0.01 to 5 wt %, 0.01 to 3 wt %, 1 to 5 wt % or 2 to 4 wt % with respect to 100 wt % of the total reactants, and the amount of a heterogeneous catalyst may be in the range of 5 to 200 wt %, 5 to 100 wt %, 20 to 200 wt % or 20 to 150 wt % with respect to a total amount of the reactants.

The direct esterification may be performed at 80 to 270° C., preferably, 150 to 250° C. for 10 minutes to 10 hours, preferably, 30 minutes to 8 hours, and more preferably 1 to 6 hours. A terephthalate-based material may be effectively obtained in the above ranges of temperatures and time.

When the terephthalate-based material is a mixture, terephthalate compounds may be prepared through the above-described direct esterification and then mixed, or may be prepared through trans-esterification between any one terephthalate selected from di(2-ethylhexyl)terephthalate and diisononyl terephthalate and any one alcohol selected from butyl alcohol and isononyl alcohol.

The term "trans-esterification" used herein refers to a reaction between an alcohol and an ester as shown in Reaction Formula 1, in which R" of the ester is interchanged with R' of the alcohol.

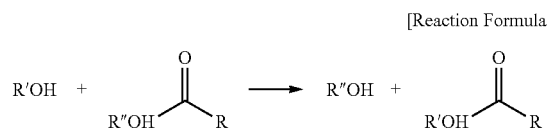

[Reaction Formula 1]

According to an exemplary embodiment of the present invention, the trans-esterification may produce three types of ester compositions according to three cases in which an alkoxide of the alcohol attacks carbons of two ester (RCOOR") groups present in an ester-based compound; an alkoxide of the alcohol attacks carbons of one ester (RCOOR") group present in an ester-based compound; and there is no reaction between an alcohol and an ester group in an ester-based compound.

In addition, compared to acid-alcohol esterification, the trans-esterification does not cause water contamination and may solve problems caused by the use of an acidic catalyst because the reaction can be performed without a catalyst.

For example, the di(2-ethylhexyl) terephthalate and butyl alcohol may produce a mixture of di(2-ethylhexyl) terephthalate, butyl(2-ethylhexyl) terephthalate and dibutyl terephthalate by the trans-esterification, and these three types of terephthalates may be formed at 3.0 to 70 wt %, 0.5 to 50 wt %, and 0.5 to 85 wt %, specifically, 10 to 50 wt %, 0.5 to 50 wt %, and 35 to 80 wt %, respectively, with respect to a total weight of the mixture. Within these ranges, a terephthalate-based material (mixture) having high process efficiency and excellent processability and absorption rate may be obtained.

In addition, a composition ratio of the mixture prepared by the trans-esterification may be controlled according to an amount of the alcohol added.

The amount of the alcohol added may be 0.1 to 89.9 parts by weight, specifically, 3 to 50 parts by weight, and more specifically 5 to 40 parts by weight with respect to 100 parts by weight of the terephthalate-based material.

As the amount of the alcohol added increases, a mole fraction of the terephthalate compound participating in the trans-esterification is higher, and therefore, the contents of the products, which are two terephthalate compounds in the mixture may increase, and comparatively, a content of the terephthalate compound present unreacted may tend to be decreased.

According to an exemplary embodiment of the present invention, a molar ratio of the reactants, which are the terephthalate compound and alcohol, may be, for example, 1:0.005 to 5.0, 1:0.05 to 2.5, or 1:0.1 to 1.0. Within this range, an ester-based plasticizer composition having high process efficiency and an excellent effect of improving processability may be obtained.

However, the composition ratio of the mixture of three types of terephthalates is not limited to the above range, and any one of the three types of terephthalates may be further added to change the composition ratio. Available mixed composition ratios are as described above.

The ester-based composition prepared through the trans-esterification may include all of a single attack ester compound, a dual attack ester compound, and reaction residual ester compound, and a composition ratio of the ester-based composition may be controlled according to the amount of the alcohol added.

The amount of the alcohol added may be 0.1 to 89.9 parts by weight, specifically 3 to 50 parts by weight, and more specifically 5 to 40 parts by weight with respect to 100 parts by weight of the terephthalate-based material.

In the terephthalate-based material, as the amount of the alcohol added increases, a mole fraction of the terephthalate participating in the trans-esterification may increase. Accordingly, in the plasticizer composition, contents of the terephthalate produced by attacking only one ester group and the terephthalate produced by attacking two ester groups may increase.

In addition, in comparison, a content of the residual terephthalate present unreacted may tend to be decreased.

A molar ratio of the terephthalate and alcohol may be, for example, 1:0.005 to 5.0, 1:0.05 to 2.5, or 1:0.1 to 1.0. Within this range, a terephthalate-based material capable of providing a plasticizer composition having high process efficiency and an excellent effect of improving processability may be obtained.

The trans-esterification may be performed at a reaction temperature of 120 to 190° C., preferably 135 to 180° C., and more preferably 141 to 179° C. for 10 minutes to 10 hours, preferably 30 minutes to 8 hours, and more preferably 1 to 6 hours. Within the above temperature and time ranges, a mixture of terephthalate-based materials at a desired composition ratio may be effectively obtained. Here, the reaction time may be calculated from the point of time to reach the reaction temperature after temperature rising for the reactants.

The trans-esterification may be performed without a catalyst, but in some cases, may be performed under an acidic catalyst or metal catalyst, which provides an effect of reducing the reaction time.

The acidic catalyst may be, for example, sulfuric acid, methanesulfonic acid, p-toluenesulfonic acid or the like, and the metal catalyst may be, for example, an organic metal catalyst, a metal oxide catalyst, a metal salt catalyst or a metal itself.

The metal component may be, for example, any one or a mixture of two or more selected from the group consisting of tin, titanium and zirconium.

In addition, removing an unreacted alcohol and a reaction by-product through distillation after the trans-esterification may be further included.

The distillation may be, for example, two-step distillation for separating the alcohol and the reaction by-product using a difference in boiling point.

In another example, the distillation may be mixed distillation. In this case, an ester-based plasticizer composition may be relatively and stably ensured at a desired composition ratio. The mixed distillation means simultaneous distillation of butanol and a reaction by-product.

The hydrogenation may be conversion of a terephthalate-based material into a cyclohexane 1,4-diester-based material by hydrogenating the terephthalate-based material, which may be a single compound or a mixture, in the presence of a metal catalyst.

The hydrogenation may be a reaction for eliminating aromaticity of benzene rings of the terephthalate-based materials by adding hydrogen in the presence of a metal catalyst, which may be a type of reduction.

The hydrogenation is for synthesizing a cyclohexane 1,4-diester-based material by reacting the terephthalate-based material and hydrogen in the presence of a metal catalyst, and conditions for this reaction may include all of the conventional reaction conditions for hydrogenating only benzene rings without affecting carbonyl groups substituted to the benzenes.

The hydrogenation may be performed with an additional organic solvent such as ethanol or the like, but the present invention is not limited thereto. The metal catalyst may be an Rh/C catalyst, a Pt catalyst, a Pd catalyst or the like, which is generally used to hydrogenate a benzene ring, and any one capable of being used in the hydrogenation is used without limitation.

In the blending, a cyclohexane 1,4-diester-based material obtained by conversion of the terephthalate-based material through hydrogenation may be blended with a dibenzoate-based material at a weight ratio of 1:99 to 99:1 to prepare the plasticizer composition, and the cyclohexane 1,4-diester-based material may depend on whether the terephthalate-based material is a single compound or a mixture, and thus can be a single compound or a mixture.

Contents, types, and mixing ratio of the cyclohexane 1,4-diester-based material and the dibenzoate-based material, which are mixed in the blending have been described above, and thus the descriptions thereof will be omitted.

The above-described direct esterification and trans-esterification may be applied to prepare the above-described dibenzoate-based material. As such, when the dibenzoate-based material is prepared through the direct esterification or trans-esterification, the same process as described in the preparation of the terephthalate-based material may be applied.

According to another exemplary embodiment of the present invention, there is provided a resin composition including the above-described plasticizer composition and a resin.

The resin may be any resin known in the art. For example, the resin may be a mixture of one or more selected from the group consisting of ethylene vinyl acetate, polyethylene, polypropylene, polyketone, polyvinyl chloride, polystyrene, polyurethane, a thermoplastic elastomer and polylactic acid, but the present invention is not limited thereto.

The plasticizer composition may be included at 5 to 150 parts by weight, preferably, 5 to 130 parts by weight on the basis of 100 parts by weight of the resin.

As such, a content of the plasticizer refers to an amount of a plasticizer used according to types of the resin and types of industry and product. For example, in the case of a polyvinyl chloride resin, there is a paste resin or straight resin, and the paste resin is used for plastisol processing and about 50 to 130 parts by weight of a plasticizer with respect to the resin may be used, and the straight resin is used for melt processing (calendering, extrusion, injection processes and the like) and about 5 to 60 parts by weight of a plasticizer with respect to the resin may be used.

The resin composition may further include a filler. The filler may be included at 0 to 300 parts by weight, preferably, 50 to 200 parts by weight, and more preferably, 100 to 200 parts by weight on the basis of 100 parts by weight of the resin.

The filler may be any filler known in the art without particular limitation. For example, the filler may be a mixture of one or more selected from silica, magnesium carbonate, calcium carbonate, hard charcoal, talc, magnesium hydroxide, titanium dioxide, magnesium oxide, calcium hydroxide, aluminum hydroxide, aluminum silicate, magnesium silicate and barium sulfate.

In addition, the resin composition may further include other additives such as a stabilizer and the like as necessary. The additives such as a stabilizer and the like may be, for example, included at 0 to 20 parts by weight, preferably, 1 to 15 parts by weight on the basis of 100 parts by weight of the resin.

The stabilizer may be, for example, a calcium-zinc (Ca—Zn)-based stabilizer such as calcium-zinc combined stearate or the like, but the present invention is not particularly limited thereto.

BEST MODE

Example

Hereinafter, embodiments will be described in detail for promoting an understanding of the present invention. However, embodiments of the present invention may be modified in several different forms, and the scope of the present invention is not limited to the embodiments to be described below. The embodiments of the present invention are provided so that this disclosure will be thorough and complete, and will fully convey the concept of embodiments to those skilled in the art.

Preparation Example 1: Preparation of di(2-ethylhexyl) cyclohexane-1,4-diester

1) Esterification 498.0 g of purified terephthalic acid (PTA), 1,170 g of 2-ethylhexyl alcohol (2-EH; a molar ratio of PTA:INA is (1.0):(3.0)) and 1.54 g of a titanium-based catalyst (tetra isopropyl titanate (TIPT); 0.31 parts by weight with respect to 100 parts by weight of PTA) as a catalyst were put into a 4-neck 3 L reaction vessel equipped with a cooler, a condenser, a decanter, a reflux pump, a temperature controller, an agitator and the like, and then a temperature was slowly increased to about 170° C. At about 170° C., water was generated, and esterification was performed for about 4.5 hours while a nitrogen gas was continuously added at a reaction temperature of about 220° C. under atmospheric pressure, and then terminated when an acid value reached 0.01.

After the reaction, distillation extraction was performed for 0.5 to 4 hours under reduced pressure to remove unreacted components. To remove unreacted components at a predetermined content or less, steam extraction was performed using steam for 0.5 to 3 hours under reduced pressure, and neutralization was performed using an alkali solution after a reaction solution was cooled to about 90° C. Additionally, washing could be performed, and then the reaction solution was dehydrated to remove moisture. Filter media were put into the dehydrated reaction solution, stirred for a predetermined time and then filtered, thereby finally obtaining 1,326.7 g of di(2-ethylhexyl)terephthalate (DEHTP) (yield: 99.0%).

2) Hydrogenation 1,000 g of the composition produced by the esterification and 20 g of a ruthenium catalyst (N.E CHEMCAT) were added as components to a 1.5 L high-pressure reaction vessel, and hydrogen was added under a pressure of 8 MPa to perform hydrogenation at 150° C. for 3 hours, and then the reaction was completed. After the reaction, the catalyst was filtered and subjected to a conventional purification process, thereby preparing a hydrogenated material with a yield of 99%.

Preparation Example 2: Preparation of diisononyl cyclohexane-1,4-diester

A hydrogenated material was obtained through esterification and hydrogenation in the same manner as in Preparation Example 1 except that isononyl alcohol was used instead of 2-ethylhexyl alcohol upon esterification.

Preparation Example 3: Preparation of di(2-propylheptyl) cyclohexane-1,4-diester A hydrogenated material was obtained through esterification and hydrogenation in the same manner as in Preparation Example 1 except that 2-propylheptyl alcohol was used instead of 2-ethylhexyl alcohol upon esterification.

Preparation Example 4: Preparation of Hydrogenated Mixture of DEHTP/BEHTP/DBTP

1) Esterification 2,000 g of dioctyl terephthalate (DOTP; GL300 commercially available from LG Chem) and 340 g of n-butanol (17 parts by weight on the basis of 100 parts by weight of DOTP) were put into a reaction vessel equipped with an agitator, a condenser and a decanter, and subjected to trans-esterification for 2 hours at a reaction temperature of 160° C. under a nitrogen atmosphere, thereby obtaining an ester-based plasticizer composition including dibutyl terephthalate (DBTP), butyl isononyl terephthalate (BINTP) and diisononyl terephthalate (DINTP) at 4.0 wt %, 35.0 wt % and 61.0 wt %, respectively.

The reaction product was mixed and distilled to remove butanol and 2-ethylhexyl alcohol, thereby finally preparing a mixed composition.

2) Hydrogenation 1,000 g of the composition produced by the esterification and 20 g of a ruthenium catalyst (N.E CHEMCAT) were added as components to a 1.5 L high-pressure reaction vessel, and hydrogen was added under a pressure of 8 MPa to perform hydrogenation at 150° C. for 3 hours, and then the reaction was completed. After the reaction, the catalyst was filtered and subjected to a conventional purification process, thereby preparing a hydrogenated mixed composition with a yield of 99%.

Preparation Example 5: Preparation of diethylene glycol dibenzoate (DEGDB)

1,221 g of purified benzoic acid (BA), 530.5 g of diethylene glycol (DEG; a molar ratio of BA:DEG is (2.0):(1.0)), 2.0 g of a titanium-based catalyst (tetra isopropyl titanate (TIPT)) as a catalyst and a small amount of xylene were put into a 4-neck 2 L reaction vessel equipped with a cooler, a condenser, a decanter, a reflux pump, a temperature controller, an agitator and the like, and then a temperature was slowly increased to about 170° C. When water was generated at approximately 170° C., the amount of xylene was adjusted to facilitate the removal of the generated water, and the reaction was terminated when the content of a monobenzoate as an intermediate among the reactants was 5% or less. Afterward, 1,530 g of the final product DEGDB (yield: 98%) was obtained by a purification method similar to that described in Preparation Example 1.

Preparation Example 6: Preparation of dipropylene glycol dibenzoate (DPGDB)

DPGDB was obtained in the same manner as in Preparation Example 5 except that dipropylene glycol was used instead of diethylene glycol.

Preparation Example 7: Preparation of triethylene glycol dibenzoate (TEGDB)

TEGDB was obtained in the same manner as in Preparation Example 5 except that triethylene glycol was used instead of diethylene glycol.

Examples 1 to 8 and Comparative Examples 1 to 7

Examples and Comparative Examples were prepared using the materials prepared in Preparation Examples 1 to 7 as shown in the following Table 1.

TABLE 1

|  | Hydrogenated TP-based material | Benzoate-based material | Mixing ratio |
| --- | --- | --- | --- |
| Example 1 | 1,4-DEHCH | DEGDB | 7:3 |
| Example 2 | 1,4-DEHCH | DEGDB | 9:1 |
| Example 3 | 1,4-DINCH | DEGDB | 8:2 |
| Example 4 | 1,4-DINCH | DPGDB | 6:4 |
| Example 5 | 1,4-DPHCH | DEGDB | 8:2 |
| Example 6 | 1,4-DPHCH | DEGDB | 6:4 |
| Example 7 | (Preparation Example 4) | DEGDB | 7:3 |
| Example 8 | (Preparation Example 4) | TEGDB | 5:5 |
| Comparative Example 1 | 1,4-DEHCH | — | — |
| Comparative Example 2 | 1,2-DEHCH | — | — |
| Comparative Example 3 | — | DEGDB | — |
| Comparative Example 4 | 1,4-DEHCH | DEGDB | 1:9 |
| Comparative Example 5 | 1,4-DEHCH | DEGDB | 3:7 |
| Comparative Example 6 | 1,2-DEHCH | DEGDB | 7:3 |
| Comparative Example 7 | 1,3-DEHCH | DEGDB | 7:3 |

Experimental Example 1: Preparation of Samples and Performance Evaluation

The plasticizers according to Examples 1 to 8 and Comparative Examples 1 to 7 were used as experimental samples. For sample preparation, referring to ASTM D638, 40 parts by weight of each of the plasticizers and 3 parts by weight of a stabilizer (BZ-153T commercially available from Songwon) were mixed with 100 parts by weight of PVC (LS100S commercially available from LG Chem) in a mixer, and the resulting mixture was subjected to rollmilling at 170° C. for 4 minutes and pressed for 2.5 minutes (low pressure) and 2 minutes (high pressure) at 180° C. using a press, thereby manufacturing 1 T and 3 T sheets. Each sample was subjected to a test for properties, results of which are shown in the following Table 2 below.

<Test Items>
Hardness

According to ASTM D2240, Shore hardness (Shore "A") was measured at 25° C. under conditions of 3 T and 10 s.

Tensile Strength

According to ASTM D638, each specimen was pulled at a cross head speed of 200 mm/min (1 T) using a tester, U.T.M, (Manufacturer; Instron, Model No.; 4466), and a position at which the specimen was broken was detected. A tensile strength was calculated as follows:

Tensile strength (kgf/mm$^2$)=Load value (kgf)/Thickness (mm)×Width (mm)

Measurement of Elongation Rate

According to ASTM D638, each specimen was pulled at a cross head speed of 200 mm/min (1 T) using the U.T.M, and a position at which the specimen was broken was detected. An elongation rate was calculated as follows:

Elongation rate (%)=Length after elongation/Initial length×100

Measurement of Migration Loss

An experimental specimen having a thickness of 2 mm or more was obtained according to KSM-3156, glass plates was attached to both sides of the specimen, and then a load of 1 kgf/cm$^2$ was applied to the specimen. The specimen was kept in a forced convection oven (80° C.) for 72 hours, then taken out of the oven, and cooled at room temperature for 4 hours. Then, after the glass plates attached to both sides of the specimen were removed, a weight before and after the glass plate and the specimen plate were kept in the oven was measured and thus a migration loss was calculated by the equation as follows.

Migration loss (%)=[(Initial weight of specimen at room temperature−Weight of specimen after being kept in oven)/Initial weight of specimen at room temperature]×100

Measurement of Volatile Loss

The prepared specimen was processed at 80° C. for 72 hours, and a weight of the specimen was measured as follows:

Volatile loss (wt %)=Initial weight of specimen−(Weight of specimen after being processed at 80° C. for 72 hours)/Initial weight of specimen×100

Measurement of Absorption Rate

An absorption rate was evaluated by measuring the time taken to stabilize the torque of a mixer in which a resin and an ester compound are mixed together using a planetary mixer (Brabender, P600) under conditions of 77° C. and 60 rpm.

TABLE 2

|  | Hardness (Shore A) | Tensile strength (kg/cm$^2$) | Elongation rate (%) | Migration loss (%) | Volatile loss (%) | Absorption rate (m:s) |
| --- | --- | --- | --- | --- | --- | --- |
| Example 1 | 81.5 | 229.1 | 286.1 | 3.23 | 3.88 | 3:25 |
| Example 2 | 81.7 | 231.0 | 294.6 | 2.68 | 3.36 | 3:45 |
| Example 3 | 82.5 | 234.7 | 304.5 | 2.56 | 3.66 | 4:10 |
| Example 4 | 81.0 | 235.8 | 310.7 | 2.14 | 3.70 | 4:30 |
| Example 5 | 83.0 | 240.5 | 314.0 | 2.01 | 3.40 | 4:30 |
| Example 6 | 80.6 | 236.8 | 306.1 | 1.67 | 3.50 | 3:35 |
| Example 7 | 79.3 | 229.7 | 314.2 | 3.40 | 4.82 | 3:00 |
| Example 8 | 79.2 | 235.6 | 311.5 | 2.65 | 4.50 | 3:25 |
| Comparative Example 1 | 85.7 | 210.6 | 293.3 | 4.57 | 5.70 | 5:40 |
| Comparative Example 2 | 85.0 | 204.0 | 285.0 | 4.32 | 6.55 | 5:30 |
| Comparative Example 3 | 76.5 | 182.3 | 260.4 | 3.51 | 7.02 | 0:30 |
| Comparative Example 4 | 77.1 | 208.5 | 261.2 | 4.40 | 6.20 | 1:40 |
| Comparative Example 5 | 78.2 | 215.9 | 270.7 | 4.10 | 5.88 | 2:25 |
| Comparative Example 6 | 81.3 | 227.1 | 296.5 | 4.59 | 5.23 | 4:00 |
| Comparative Example 7 | 81.7 | 215.5 | 300.4 | 4.93 | 5.10 | 4:10 |

Referring to Table 2, it was confirmed that Comparative Examples 1 to 7 exhibited significantly inferior tensile strength, migration loss and volatile loss to those of Examples 1 to 8.

Specifically, it can be seen that Comparative Examples 1 and 2, in which a dibenzoate-based material was not added, exhibited low tensile strength and high hardness, and thus poor plasticization efficiency and significantly high migration loss and volatile loss were exhibited. In addition, it can be seen that Comparative Example 3, in which a cyclohexane 1,4-diester-based material was not added, exhibited a significant decrease in tensile strength and a significantly low elongation rate, and is difficult to function alone as a plasticizer in consideration of the absorption rate or volatile loss. On the other hand, it can be seen that Examples 1 to 8, in which a dibenzoate-based material and a cyclohexane 1,4-diester-based material were used in combination, exhibited a significant increase in tensile strength and an elongation rate due to in a synergistic effect thereof and also exhibited a significant decrease in properties such as migration loss and volatile loss due to a synergistic effect thereof.

In addition, in consideration of a ratio range of two materials, it can be seen that Comparative Examples 4 and 5, in which a dibenzoate-based material was included at 70 wt % or more, were not improved in tensile strength, volatile loss and migration loss as in the case of not adding a dibenzoate-based material, but Examples 1 to 8, in which a dibenzoate-based material was included at less than 70 wt %, were improved in properties.

Further, as shown in Comparative Examples 6 and 7, when a diester is bound not at 1,4 positions but at 1,2 positions or 1,3 positions, it can be seen that most properties such as an elongation rate, tensile strength, migration loss, volatile loss and the like were not improved. Specifically, in Example 1, it can be confirmed that an elongation rate was improved (increased) by about 5%, migration loss was improved (decreased) by 40% or more, and volatile loss was also significantly improved (decreased) compared to Comparative Examples 6 and 7 in which the same mixing ratio as that in Example 1 was applied.

Through the above results, it can be confirmed that properties of the plasticizer may be significantly improved by applying characteristics of mixing a cyclohexane 1,4-diester-based material and a dibenzoate-based material, a weight ratio upon the mixing of two materials and a binding position of a diester group bound to cyclohexane.

The invention claimed is:

1. A plasticizer composition for a polyvinyl chloride comprising:
   a cyclohexane 1,4-diester-based material; and
   a dibenzoate-based material,
   wherein the plasticizer composition is comprised in an amount of 40 to 130 parts by weight relative to 100 parts by weight of the polyvinyl chloride,
   wherein a weight ratio of the cyclohexane 1,4-diester-based material to the dibenzoate-based material included in the plasticizer composition is 90:10 to 50:50,
   wherein the cyclohexane 1,4-diester-based material is a single compound or a mixture of two or more selected from the group consisting of butyl(2-ethylhexyl) cyclohexane-1,4- diester (1,4-BEHCH), (2-ethylhexyl) isononyl cyclohexane-1,4-diester (1,4-EHINCH), butyl isononyl cyclohexane-1,4-diester (1,4-BINCH), dibutyl cyclohexane-1,4-diester (1,4-DBCH), diisononyl cyclohexane-1,4-diester (1,4-DINCH) and di(2-ethylhexyl) cyclohexane-1,4-diester (1,4-DEHCH), and
   wherein the dibenzoate-based material is one or more selected from the group consisting of diethylene glycol dibenzoate (DEGDB), dipropylene glycol dibenzoate (DPGDB) and triethylene glycol dibenzoate (TEGDB).

2. A polyvinyl chloride resin composition comprising: the plasticizer composition according to claim 1.

* * * * *